United States Patent Office 3,137,703
Patented June 16, 1964

3,137,703
PHTHALOCYANINE CHELATES
John C. Burbach, Niagara Falls, N.Y., assignor to Union Carbide Corporation, a corporation of New York
No Drawing. Filed Dec. 23, 1960, Ser. No. 77,823
9 Claims. (Cl. 260—314.5)

The present invention relates to a novel process for the production of chelated phthalocyanine compounds and to novel compounds which are useful as pigments.

Because of the intense coloration and other useful properties, phthalocyanine salts of several metals are employed in the dye industry and as colored fillers. Heretofore, these salts have been prepared by reacting such materials as phthalic anhydride, phthalimide, phthalonitrile, and their derivatives, with a metal oxide or with a metallic element.

With the exception of vanadium, the phthalocyanine salts of the Group IV and VB metals cannot be prepared according to the teachings of the art, that is, from the elemental form or from the oxides, because of the non-reactivity of these materials with phthalocyanine-forming reagents such as phthalonitrile, substituted phthalonitriles, phthalic anhydride and the like.

It is an object of the present invention to provide a process for the preparation of phthalocyanines of the vanadium, columbium, tantalum, titanium, zirconium, and hafnium.

It is another object of this invention to provide novel phthalocyanine chelated compounds suitable for use as colored pigments and for other purposes, such as lubricant components, high-temperature materials, and in semi-conductor-type applications.

Other objects of the invention will be apparent from the subsequent description and appended claims.

The process which satisfies the objects of the invention comprises intimately mixing and reacting; in an inert atmosphere, a suitable molten phthalonitrile compound with an anhydrous chloride, bromide, or iodide of a Group IVB or Group VB metal whereby the phthalocyanine of the metal is formed, and separating the metal phthalocyanine from the reaction mixture.

The novel compounds produced in accordance with the objects of the invention are represented by the empirical formula:

$$[\phi(CN)_2]_4 \, MX_x(OH)_{n-x}$$

wherein
$\phi(CN)_2$ is a phthalonitrile compound
M is a metal selected from the group consisting of titanium, zirconium, hafnium, columbium, and tantalum
$n$ is the electrovalence of M
X is a halide selected from the group consisting of chlorine, bromine, and iodine
and $x$ is the number of halogens associated with M and is from 1 up to, and including, $n$.

The preferred phthalonitrile compound for use in the process of the present invention is phthalonitrile. However, substituted phthalonitriles are also useful provided the substituent groups do not tend to react to destroy the anhydrous metal halide, for example, by liberating water, by entering into oxidation-reduction reactions with the lower valent metal salts, and by forming complexes other than the phthalocyanine complex. No substituent can be used if it preferentially chelates or otherwise reacts with transition metal salts at the expense of the nitrile groups. The groups are also to be avoided which interfere by steric hindrance.

Suitable substituent groups include alkyl, aryl, halide, and additional nitrile groups.

Substituent groups which are to be avoided include hydroxyl and phenol groups, carboxylic acid groups, any of the oxygen, nitrogen, and sulfur compounds which are intrinsically reactive with transition metal compounds to form donor-acceptor complexes under mild conditions or form metal oxides, nitrides, and sulfur compounds under drastic conditions, ethers, ketones, amides and amide derivatives, aliphatic and aromatic nitrogen bases including alkyl and aryl amines, anilines, pyridine and quinoline and their derivatives and analogs, hydrazines, ketimines, sulfonic acids, sulfonamide, sulfides, sulfones, and, in the case where lower valent metal halides are involved, nitro groups.

The halides of the Group IVB or Group VB metal may be either in the highest oxidation state or in a subvalent condition, the latter being preferred because subhalides possess adequate metal orbital vacancies to form chelates more readily with electron donors such as the phthalocyanine reagents.

For a complete and efficient reaction it is recommended that any solid reactant employed in the process be finely comminuted, preferably to less than 100 mesh (U.S. Sieve Series), and that a slight excess of the phthalonitrile be employed in order to compensate for the volatilization of some phthalonitrile during the exothermic reactions.

Upon heating, a reaction takes place between the phthalonitrile and the halide of the metal which varies from slightly to vigorously exothermic, depending on the halide employed. To prevent violent reactions, a diluent may be used in conjunction with the reactants. For example, mineral oil was found to be quite suitable, although any other chemically inert diluent may be employed. Often, the reaction is exothermic enough to result in considerable gas displacement, due to the thermal expansion of the vessel atmosphere. In this case, it is recommended to allow the expanded gas to escape from the reaction zone, for example by venting it to the atmosphere.

Heating of the reactants is generally, but not necessarily done externally and the temperatures at which the reaction is to proceed exothermically range from approximately the melting point to approximately the boiling point of the phthalonitrile employed.

The concentration of the sulfuric acid, in which the product of the reaction is dissolved should be at least 93% and preferably 98%. Lower acid concentrations are not satisfactory because of their tendency to dissolve the product only to a partial amount.

The precipitated chelate may be recovered from the reaction mixture by any standard techniques. However, one particularly effective means comprises dissolving the precipitate in sulfuric acid and re-precipitating the chelate compound.

The precipitation of the product from its solution in concentrated sulfuric acid and its subsequent refinement may be accomplished by any known method. For example, one suitable procedure consists of pouring the solution in water, thus producing a very fine, intensely colored, colloidal solid pigment, filtering the pigment, leaching the residue with acetone or other solvent which will not attack the organic structure, refiltering, washing, and drying. Another equally satisfactory method comprises the replacement of water in the precipitation step with acetone or equivalent solvent, thus obviating some intermediate operations, since leaching and refiltering can be combined and the unreacted phthalonitrile and organic by-products can be satisfactorily removed. Still another suitable procedure comprises the sublimation in vacuum or in an inert atmosphere at elevated temperatures of the crude reaction products.

The products obtained are highly colored materials, which also have lubricating properties due to the laminar crystal structures thereof and are very stable because of the resonance stabilization of the conjugated porphin ring and associated aromatic rings.

EXAMPLE I

A mixture of approximately 10 grams of phthalonitrile powder and 2 grams of titanium trichloride was prepared in a dry box under argon and transferred into an Erlenmeyer flask. The flask was stoppered and the charge, subsequently heated over a gas burner to about 150° C. Upon melting of the phthalonitrile, and exothermic reaction ensued between the components of the mixture with the formation of a dark-colored solid. Hot argon gas was displaced by thermal expansion and was permitted to escape from the flask through a vent. The product was dissolved in 98% concentrated $H_2SO_4$ and precipitated by pouring the solution into water, thus producing a very fine, intensely blue, colloidal, solid pigment. This blue pigment was filtered off, leached with acetone to remove unreacted phthalonitrile and organic by-products, refiltered, washed, and dried, leaving about 5 grams of an intensely blue-colored powder, analyzing approximately 95% titanium phthalocyanine $[C_6H_4(CN)_2]_4TiCl_3$.

EXAMPLE II

A mixture of 26 grams of phthalonitrile powder, 3.5 grams of titanium trichloride, and 100 milliliters of mineral oil was prepared in a dry box under argon and transferred into an Erlenmeyer flask. The charge was subsequently heated over a burner to the boiling point of the mineral oil, approximately 350° C., and refluxed for several minutes to produce a dark solid precipitate in the oil. The product was dissolved in 98 percent concentrated $H_2SO_4$ and this solution was poured into water. The oil was decanted off, and the colloidal blue pigment was filtered, leached with acetone, refiltered, washed, and dried, leaving 6.8 grams of a deep blue, powdery solid, analyzing 95 percent titanium phthalocyanine $$[C_6H_4(CN)_2]_4TiCl_3$$

EXAMPLE III

A larger reaction mixture was prepared by mixing 112.2 grams of phthalonitrile (0.875 mole) and 35.1 grams of ground titanium trichloride (0.227 mole) under argon in a flask in a dry box. The flask was fitted with a stopper with an argon purge inlet and exit, and purged at the rate of 3 cubic feet of argon per hour. The mixture was carefully heated until liquefaction occurred, above 138° C., initiating a very vigorous exothermic reaction. The dark solid reaction was cooled, broken up, and dissolved in 1500 milliliters of reagent grade 98 percent sulfuric acid. After two hours of standing, the brown-colored mixture was poured into six liters of water. A deep blue titanium phthalocyanine precipitated; the precipitate was filtered hot, washed with methanol, ether, and then dried. The recovery was 94.2 grams. Analysis of the product indicated 15.8 percent nitrogen, 6.9 percent titanium, 12.8 percent chlorine, 57.8 percent carbon, and 3.3 percent $SO_4$. The prolonged standing of the chelate in the sulfuric acid resulted in the replacement of some of the chloride by sulfate.

Titanium phthalocyanine sublimes at 500° C. in vacuo without loss of metal to deposit a deep blue product designated as the beta phase. The acid-precipitated product is designated as the alpha phase. The lattice spacings for the two crystal modifications of $[C_6H_4(CN)_2]_4TiCl_3$, as determined by X-ray diffraction data, are provided in Table 1, expressed in angstrom units.

Table 1

| α-Phase | β-Phase | |
|---|---|---|
| 2.42 —W. | 2.05—W. | 5.40—M. |
| 3.10 —M. | 2.73—W. | 5.90—M.S. |
| 3.275—S. | 3.12—M. | 6.60—M.S. |
| 3.57 —V.S. | 3.30—W. | 6.90—M. |
| 4.98 —V.W. | 3.40-M. | 8.50—M.S. |
| 5.75 —M. | 3.50—M.S. | 9.40—M. |
| 6.38 —M. | 3.65—M. | 11.70—V.S. |
| 9.56 —M. | 3.93—M.S. | 13.00—M. |
| 13.0 —M. | 4.30—M. | |

The ultraviolet, visible, and infrared spectra for the titanium phthalocyanine are shown in Table 2.

Table 2

Ultravoilet spectrum: 5 mg. in 10 m. $CHCl_3$, very weak peak at 290 mμ. (α-phase)

Visible spectrum: 5 mg. in 25 ml. $CHCl_3$. (α-phase)

Absorption maxima

| wave length, mμ: | Extinction coeff., ε |
|---|---|
| 425 | 875 |
| 480 | 300 |
| 570 shoulder | 400 |
| 595 shoulder | 612 |
| 621 | 2,230 |
| 659 | 2,000 |
| 698 | 13,300 |
| 880 | 294 |

Infrared spectrum: The following spectrum was obtained from a KBr pellet containing 1 mg./2 g. KBr (α-phase).

| Wave Nos., cm.$^{-1}$: | Intensity |
|---|---|
| 727 | V.S. |
| 751 | V.S. |
| 773 | S. |
| 778 | S. |
| 891 | V.S. |
| 969 | V.S. |
| 1066 | V.S. |
| 1115 | V.S. |
| 1281 | S. |
| 1329 | V.S. |
| 1409 | M.S. |
| 1485 | M. |
| 1520 | M. |
| 1603 | M. |
| 1635 | M. |
| 1680 | V.W. |
| 1695 | Shoulder. |
| 1710 | M. |
| 1770 | V.W. |
| 1835 | V.W. |
| 1940 | V.W. |
| 2150 | V.W. |
| 2330 | W. |
| 2490 | V.W. |

EXAMPLE IV

A mixture of approximately 20 grams of phthalonitrile powder and about 5 grams of a mixture composed of 50% by weight, columbium pentachloride and 50% by weight columbium trichloride was prepared in a dry box under argon and transferred into an Erlenmeyer flask. The flask was stoppered and the charge was heated over a gas burner. Upon melting of the phthalonitrile, a slightly exothermic reaction ensued between the components of the mixture with the formation of a dark-colored solid. Hot argon gas was displaced by thermal expansion caused by the slightly exothermic reaction and permitted to escape from the flask through a vent. The product was dissolved in 98 percent concentrated $H_2SO_4$ and precipitated by pouring the solution into water, thus producing a very fine, dark-green, colloidal solid pigment. This green pigment was filtered off, leached with acetone to remove unreacted phthalonitrile and organic by-products, refiltered, washed, and dried, leaving approximately 8 grams of an intensely dark green powder, showing by various analytical methods to consist of mixed columbium phthalocyanine salts, where the halide has been partially hydrolyzed. The presence of different valvence halides in the original material, causes the formation of phthalocyanine structures in which the halogen component is partially replaced by hydroxyl groups or oxides without, however, affecting the organic structure of the compound. The product was characterized by the spectra of Table 3.

Table 3

Ultraviolet spectrum: 1 mg. phthalocyanine salt suspended in 25 ml. $CHCl_3$.

| $\lambda$, m$\mu$: | Absorbance, A |
|---|---|
| 274.0 m$\mu$ shoulder | 0.500 |
| 281.5 max. | 0.577 |
| 286.0 max. | 0.559 |
| 291.0 max. | 0.615 |
| 300.0 shoulder | 0.402 |
| 328.0 max. | 0.292 |

Visible spectrum: 1 mg. suspended in 25 ml. $CHCl_3$.

| $\lambda$, m$\mu$: | Absorbance, A |
|---|---|
| 361 max. | 0.400 |
| 633 max. | 0.226 |
| 703 max. | 0.968 |

Infrared spectrum: 2 mg. phthalocyanine salt in 2 g. KBr.

| Wave numbers, cm.$^{-1}$: | Intensity |
|---|---|
| 5000 | S. |
| 3350 | V.S. |
| 2900 | V.W. |
| 2330 | V.W. |
| 2210 | W. |
| 1721 | V.W. |
| 1769 | M. |
| 1710 | M.S. |
| 1620 | V.S. |
| 1603 | W. |
| 1555 | W. |
| 1495 | M. |
| 1485 | W. |
| 1438 | V.W. |
| 1415 | W. |
| 1379 | M. |
| 1329 | V.S. |
| 1305 | W. |
| 1283 | W. |
| 1202 | M. |
| 1148 | S. |
| 1137 | W. |
| 1115 | M. |
| 1050 | S. |
| 905 | V.W. |
| 890 | V.W. |
| 871 | V.W. |
| 820 | V.W. |
| 792 | V.W. |
| 747 | M. |
| 732 | M. |
| 716 | M. |
| 675 | V.W. |
| 662 | W. |

EXAMPLE V

A mixture of about 15 grams of phthalonitrile powder and about 2 grams of a mixture containing 89.7 percent tantalum pentaiodide and 9.0 percent tantalum pentachloride was prepared in a dry box under argon and transferred into an Erlenmeyer flask. The flask was stoppered and the charge was, subsequently, heated over a gas burner to approximately 280° C. Upon melting of the phthalonitrile, a reaction ensued between the components of the mixture with the formation of a dark-colored solid. Hot argon gas was displaced by thermal expansion and permitted to escape from the flask through a vent. The product was dissolved in 98% concentrated $H_2SO_4$ and precipitated by pouring the solution into water, thus producing a very fine, dark-green colloidal solid pigment. This green pigment was filtered off, leached with acetone to remove unreacted phthalonitrile and organic by-products, refiltered, washed, and dried, leaving about 1.5 grams of an intensely dark-green powder, showing by various analytical methods to consist of a partially hydrolyzed tantalum phthalocyanine salt in which the halogen portion of the structure was a mixture of chlorides and iodides. The product was characterized by the spectra of Table 4.

Table 4

Ultraviolet spectrum: 1 mg. of phthalocyanine salt suspended in 25 ml. $CHCl_3$.

| $\lambda$, m$\mu$: | Absorbance, A |
|---|---|
| 253.0 m$\mu$ shoulder | 0.810 |
| 287.5 max. | 0.875 |
| 337.0 max. | 0.747 |

Visible spectrum: 1 mg. phthalocyanine salt in 25 ml. $CHCl_3$

| $\lambda$, m$\mu$: | Absorbance, A |
|---|---|
| 342.0 max. | 0.660 |
| 550 max. | 0.450 |
| 595 shoulder | [1] 0.095 |
| 640 shoulder | 0.198 |
| 659 max. | 0.341 |
| 695 max. | 0.640 |

[1] Possibly weak, unresolved maxima.

Infrared spectrum: 4 mg. phthalocyanine salt in 2 g. KBr.

| Wave numbers, cm.$^{-1}$: | Intensity |
|---|---|
| 5000 | M.W. |
| 3333 | M.W. |
| 3000 | V.W. |
| 2290 | W. |
| 2195 | W. |
| 1945 | V.W. |
| 1645 | W. |
| 1595 | S. |
| 1540 | V.S. |
| 1507 | V.S. |
| 1492 | V.W. |
| 1489 | V.W. |
| 1464 | M. |
| 1445 | M.W. |
| 1429 | V.W. |
| 1417 | M. |
| 1385 | M.S. |
| 1353 | W. |
| 1325 | V.S. |
| 1315 | W. |
| 1298 | V.W. |
| 1283 | M.W. |
| 1185 | M. |
| 1264 | W. |
| 1254 | S. |
| 1114 | V.S. |
| 1073 | S. |
| 1041 | V.W. |
| 1022 | M. |
| 1000 | M.W. |
| 985 | V.W. |
| 971 | V.W. |
| 950 | W. |
| 913 | V.W. |
| 895 | S. |
| 872 | M.W. |
| 827 | M. |
| 794 | V.W. |
| 771 | S, broad. |
| 748 | S. |
| 732 | V.S. |
| 711 | M.W. |
| 666 | V.W. |

EXAMPLE VI

A mixture of approximately 15 grams of phthalonitrile powder and about 2 grams of a mixture containing 17.9 percent by weight columbium triiodide, 80 percent by weight columbium pentaiodide, and 2.1 percent by weight columbium chlorides was prepared in a dry box under argon and transferred into an Erlenmeyer flask. The flask was stoppered and the charge was heated over a gas burner. Upon melting of the phthalonitrile, a reaction ensued between the components of the mixture with the formation of a dark-colored solid. Hot argon gas was displaced by thermal expansion and permitted to escape from the flask. The product was dissolved in 98 percent concentrated $H_2SO_4$ and precipitated by pouring the solution into water, thus producing a very fine, dark-green colloidal solid pigment. This green pigment was filtered off, leached with acetone to remove unreacted phthalonitrile and organic by-products, refiltered, washed and dried, leaving about 1 gram of an intensely dark-green powder, showing by various analytical methods to consist of hydrolyzed columbium phthalocyanine salt. The product was characterized by the spectra of Table 5.

Table 5

Ultraviolet spectrum: 1 mg. suspended in 25 ml. $CHCl_3$

| $\lambda$, m$\mu$: | Absorbance, A |
|---|---|
| 275.0 max | 0.755 |
| 289.0 shoulder | 0.825 |
| 304.5 max | 0.905 |
| 337.0 max | 0.962 |

Visible spectrum: 1 mg. suspended in 25 ml. $CHCl_3$

| $\lambda$, m$\mu$: | Absorbance, A |
|---|---|
| 343.0 max | 0.810 |
| 595.0 max | 0.156 |
| 639.0 max | 0.307 |
| 655.0 max | 0.568 |
| 690.0 max | ~1.01 |

Infrared spectrum: 4 mg. of phthalocyanine salt in 2 g. KBr

| Wave numbers cm.$^{-1}$: | Intensity |
|---|---|
| 5000 | W. |
| 3333 | W. |
| 2960 | W. |
| 2300 | V.W. |
| 1555 | V.S. |
| 1539 | V.S. |
| 1500 | S. |
| 1465 | M. |
| 1443 | M.W. |
| 1436 | V.W. |
| 1415 | W. |
| 1383 | S. |
| 1325 | S. |
| 1315 | V.W. |
| 1300 | V.W. |
| 1283 | V.W. |
| 1273 | V.W. |
| 1242 | V.W. |
| 1220 | V.W. |
| 1185 | M. |
| 1153 | M.S. |
| 1114 | V.S. |
| 1090 | W. |
| 1063 | W. |
| 1023 | M. |
| 1003 | S. |
| 950 | V.W. |
| 943 | V.W. |
| 892 | M. |
| 871 | M.S. |
| 825 | M.W. |
| 772 | M. |
| 746 | S. |
| 733 | V.S. |
| 714 | M. |
| 681 | V.W. |
| 665 | M.W. |

To illustrate the utility of the products of the present invention as pigments, tests were run to compare them to copper phthalocyanine pigments.

A commercial white paint was used having the following composition by weight:

Pigment (50.6%): titanium dioxide 54.2%; calcium carbonate 45.8%

Vehicle (49.4%): siliconized soya alkyd resin 41.4%; mineral spirits and driers 58.6%

Samples of copper phthalocyanine pigments and titanium phthalocyanine pigments were prepared by reacting $Cu_2O$ and $TiCl_3$ with phthalonitrile, followed by identical purification and reprecipitation. The pigmentary samples were mixed with the white paint carrier to give additions of 0.5 percent and 5 percent by weight of phthalocyanine pigment on total paint, or 1.0 percent and 10.0 percent by weight of total pigment content. Two coats of each paint were applied to sandblasted steel and wooden panels by brush.

At the 0.5 percent level, the color intensity was largely masked by the hiding power of the titanium diodixe in the carrier paint, but at the 5.0 percent level, the titanium pigment showed considerably more tinting strength than the corresponding copper pigment, and the panels were much darker in coloration.

Reflectance measurements were taken on a gloss meter. Since the paints have the same gloss, the reflectance measurements taken reflect the degree of light absorption due to the phthalocyanine pigments used. The incident radiation was equal to a full-scale value of 1000 units and a barrier layout photocell collimated at a 60° reflected angle from the surface measured the following units of reflected light:

Steel panels: 5.0% Copper pigment 454, 430, 445; 5.0 Titanium pigment 213, 218, 236

Wood panels: 5.0% Copper pigment 483, 458, 479; 5.0% Titanium pigment 218, 200

In the foregoing tables, the following symbols were used: S for strong, V for very, M for medium, and W for weak.

Groups IVB and VB are those defined in the periodic table appearing on page 392 of the 35th Edition of Handbook of Chemistry and Physics (Chemical Rubber Publishing Company).

What is claimed is:
1. As a composition of matter, a phthalocyanine represented by the formula $[C_6H_4(CN)_2]_4MX_x(OH)_{n-x}$ wherein

M is a metal selected from the group consisting of titanium, zirconium, hafnium, columbium, and tantalum $n$ is the electrovalence of M X is a halide selected from the group consisting of chlorine, bromine, and iodine and $x$ is the number of halogens associated with M and is from 1 up to, and including, $n$.

2. A titanium phthalocyanine represented by the formula $$[C_6H_4(CN)_2]_4TiCl_3$$

3. A columbium phthalocyanine represented by the formula $$[C_6H_4(CN)_2]_4CbCl_x(OH)_{n-x}$$

wherein $x$ is an integer from 1 to $n$ denoting the number of chlorine atoms and $n$ is an integer denoting the electrovalence of the columbium atom.

4. A columbium phthalocyanine represented by the formula $$[C_6H_4(CN)_2]_4CbI_x(OH)_{n-x}$$

wherein $x$ is an integer from 1 to $n$ denoting the number of iodine atoms and $n$ is an integer denoting the electrovalence of the columbium atom.

5. A tantalum phthalocyanine represented by the formula $$[C_6H_4(CN)_2]_4TaCl_x(OH)_{n-x}$$

wherein $x$ is an integer from 1 to $n$ denoting the number of chlorine atoms and $n$ is an integer denoting the electrovalence of the tantalum atom.

6. A tantalum phthalocyanine represented by the formula $$[C_6H_4(CN)_2]_4TaI_x(OH)_{n-x}$$

wherein $x$ is an integer from 1 to $n$ denoting the number of iodine atoms and $n$ is an integer denoting the electrovalence of the tantalum atom.

7. A process for preparing phthalocyanine salts of metals of Group IVB and Group VB of the periodic table which comprises forming, in an inert atmosphere, an intimate mixture of an anhydrous metal halide selected from the group consisting of Group IVB metal chloride, Group IVB metal bromide, Group IVB metal iodide, Group VB metal chloride, Group VB metal bromide, and Group VB metal iodide, with phthalonitrile, heating said mixture in an inert atmosphere until an exothermic reaction is initiated, and subsequently recovering a phthalocyanine salt from the reaction product mixture.

8. A process in accordance with claim 7 wherein the exothermic reaction is initiated by heating the mixture to a temperature corresponding to the melting point of said phthalonitrile compound.

9. A process in accordance with claim 7 wherein the phthalocyanine salt is recovered from the reaction product mixture by dissolution in sulfuric acid and subsequent reprecipitation from the acid solution.

References Cited in the file of this patent

UNITED STATES PATENTS

| 2,155,038 | Davies et al. | Apr. 18, 1939 |
| 2,816,114 | Ehrich et al. | Dec. 10, 1957 |
| 2,980,833 | Epstein | Apr. 18, 1961 |
| 3,094,535 | Kenney et al. | June 18, 1963 |
| 3,094,536 | Kenney et al. | June 18, 1963 |

OTHER REFERENCES

Fiat, 1313, vol. III (PB 85172), page 280 TP. 910.A5.
Dahlen: Ind. and Eng. Chem., vol. 31 (1939), pages 839–841 TP 1. A58.
Fiat #1313, vol. III (PB 85172), Feb. 1, 1948, page 344 TP. 910. A5.